United States Patent
Hastings

(10) Patent No.: US 10,912,167 B2
(45) Date of Patent: Feb. 2, 2021

(54) PATTY VENDING MACHINE

(71) Applicant: Paul Hastings, Oakville (CA)

(72) Inventor: Paul Hastings, Oakville (CA)

(*) Notice: Subject to any disclaimer, the term of this patent is extended or adjusted under 35 U.S.C. 154(b) by 0 days.

(21) Appl. No.: 15/859,569

(22) Filed: Dec. 31, 2017

(65) Prior Publication Data

US 2020/0314973 A1 Oct. 1, 2020

(51) Int. Cl.
*G06Q 20/18* (2012.01)
*H05B 6/80* (2006.01)
*G07F 17/00* (2006.01)
*H05B 6/12* (2006.01)
*H05B 6/64* (2006.01)

(52) U.S. Cl.
CPC ............. *H05B 6/808* (2013.01); *G06Q 20/18* (2013.01); *G07F 17/0078* (2013.01); *H05B 6/12* (2013.01); *H05B 6/6488* (2013.01)

(58) Field of Classification Search
None
See application file for complete search history.

(56) References Cited

U.S. PATENT DOCUMENTS

| 6,383,542 B1* | 5/2002 | Khodor | G07F 9/105 |
| | | | 221/1 |
| 2001/0002674 A1* | 6/2001 | Gubbini | A21C 9/08 |
| | | | 221/13 |
| 2008/0283548 A1* | 11/2008 | Miller | G07F 9/026 |
| | | | 221/124 |
| 2010/0127013 A1* | 5/2010 | Butler | G06Q 20/123 |
| | | | 221/1 |
| 2016/0300423 A1* | 10/2016 | Mason | G07F 9/10 |

\* cited by examiner

*Primary Examiner* — Gene O Crawford
*Assistant Examiner* — Ayodeji T Ojofeitimi

(57) ABSTRACT

In vending machines that dispense food and other products, it is known to have machines that dispense stored food and other products. In this invention, selected prepackaged foods can be stored in the frozen or cold state and then prior to dispensing to the end-user, it is thawed or warmed by an internal heating process to serving temperature for customer consumption. The machine is segmentally divided both horizontally, to separate the operating machinery from food storage for hygienic and servicing reasons, and vertically, to create interchanging of the size of the modular product dispensing outlet elevator columns for adaptability to the dimensions of the stored product. Included in the design is an internal storage compartment with a mechanism that dispenses prepacked condiments that are coordinated to the selected product. This design of a vending machine may include an audiovisual screen for advertisement along with another section that identifies the available product with its calorie content. The top of the machine may have display signage that can be internally lit with color changing lights. Provisions for unattended dispensing to persons with disabilities are included by virtue of voice activated and guidance features, and illuminated and tactile surfaces.

7 Claims, 4 Drawing Sheets

PATTY VENDING MACHINE

CROSS-REFERENCE TO RELATED APPLICATIONS

This application claims priority from Canadian Patent Application No. 2976367, filed by the same inventor in Canada on Aug. 11, 2017, which is hereby incorporated by reference in its entirety.

BACKGROUND OF THE INVENTION

Field of the Invention

This invention relates to an electromechanical vending machine for food products, such as Jamaican Beef Patties, that are to be dispensed and consumed by persons.

Description of Related Art

It is common in vending machines, whether mechanical or automated, to dispense frozen products or room temperature products from a dispensing mechanism at the front of the machine after a selection and payment is made by a user.

BRIEF SUMMARY OF THE INVENTION

With markets and products changing to meet consumer demand in both urban and rural settings, this improvement allows a wider penetration and distribution of products to address that market where health and availability are both concerned for food products, and where there may be labor shortage to service a 24/7 demand.

Prepared food items that contain meat can be frozen to preserve their integrity and then heated to serving temperature from the new design features contained in this machine. This invention allows a combination of frozen and/or hot service for the dispensed product to occur in minutes of the transaction cycle, where other machines provide one or the other but not both within the same cycle. Problem due to spoilage or health issues are avoided in this improvement for vending machines. It allows a wider distribution of good healthy hot, spicy or mild exotic beef, chicken or spinach patties to rural areas as a 24/7 lunchtime nutritious meal for students in particular.

BRIEF DESCRIPTION OF THE DRAWINGS

Drawing List:—Patty Vending Machine

DRAWINGS

Figure 1B:
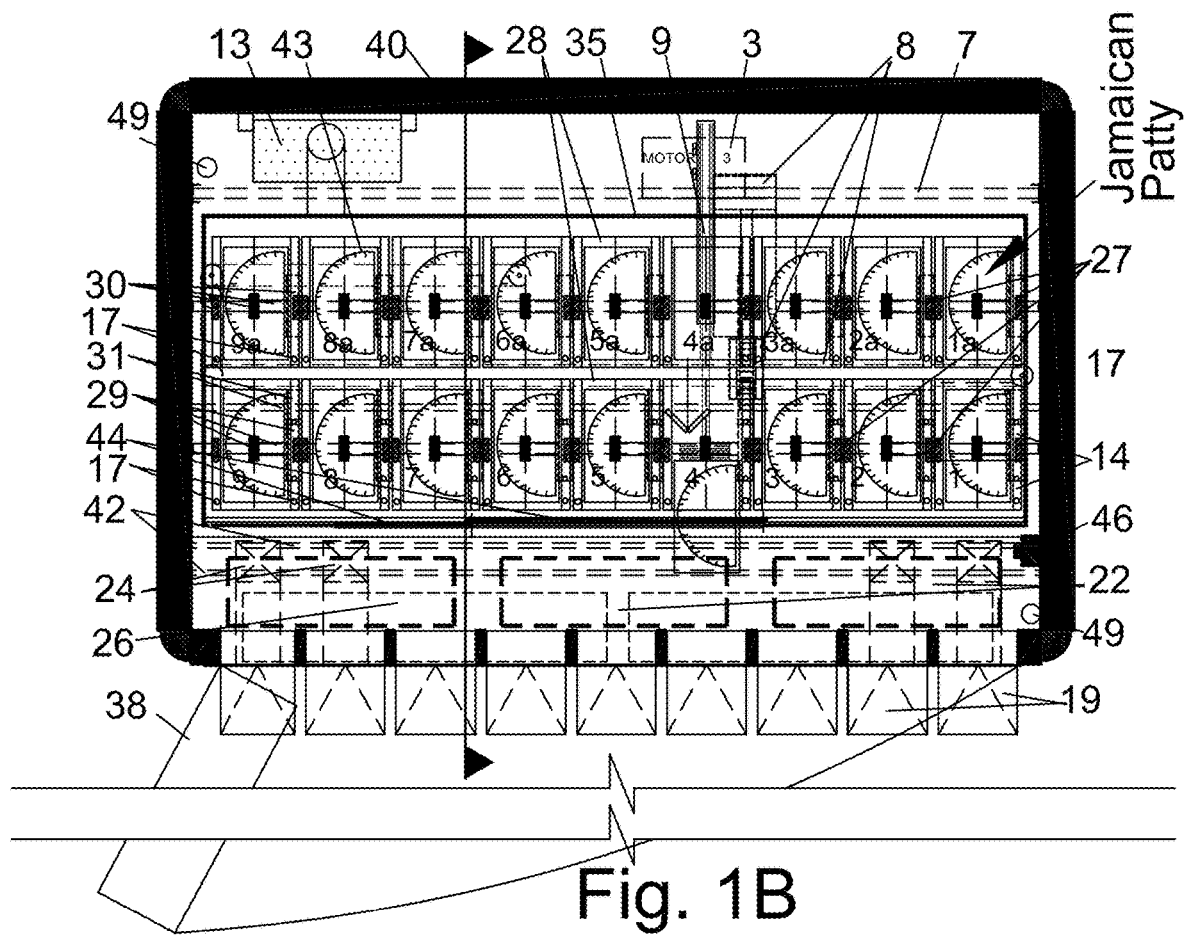
FIG. 1A—Plan at Lower Level and FIG. 1B—Plan at Higher Level
Figure 1A:
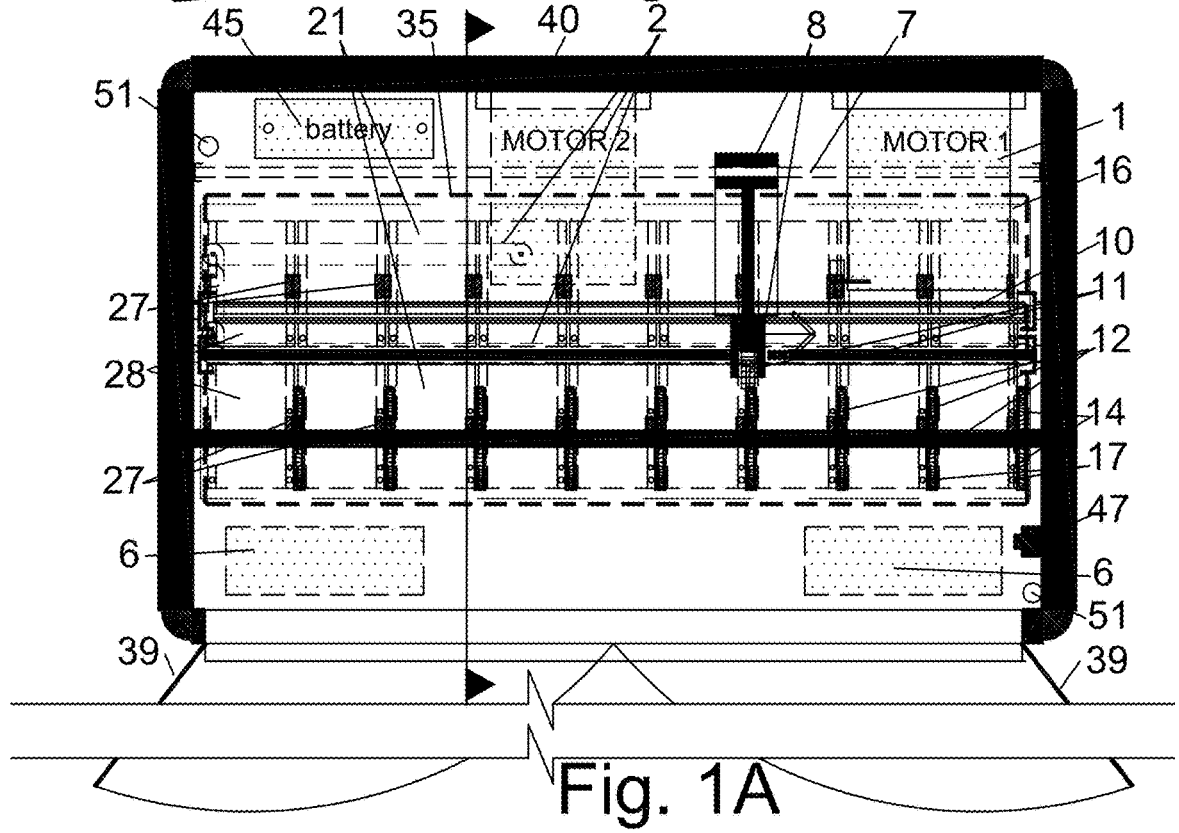
Figure 2:
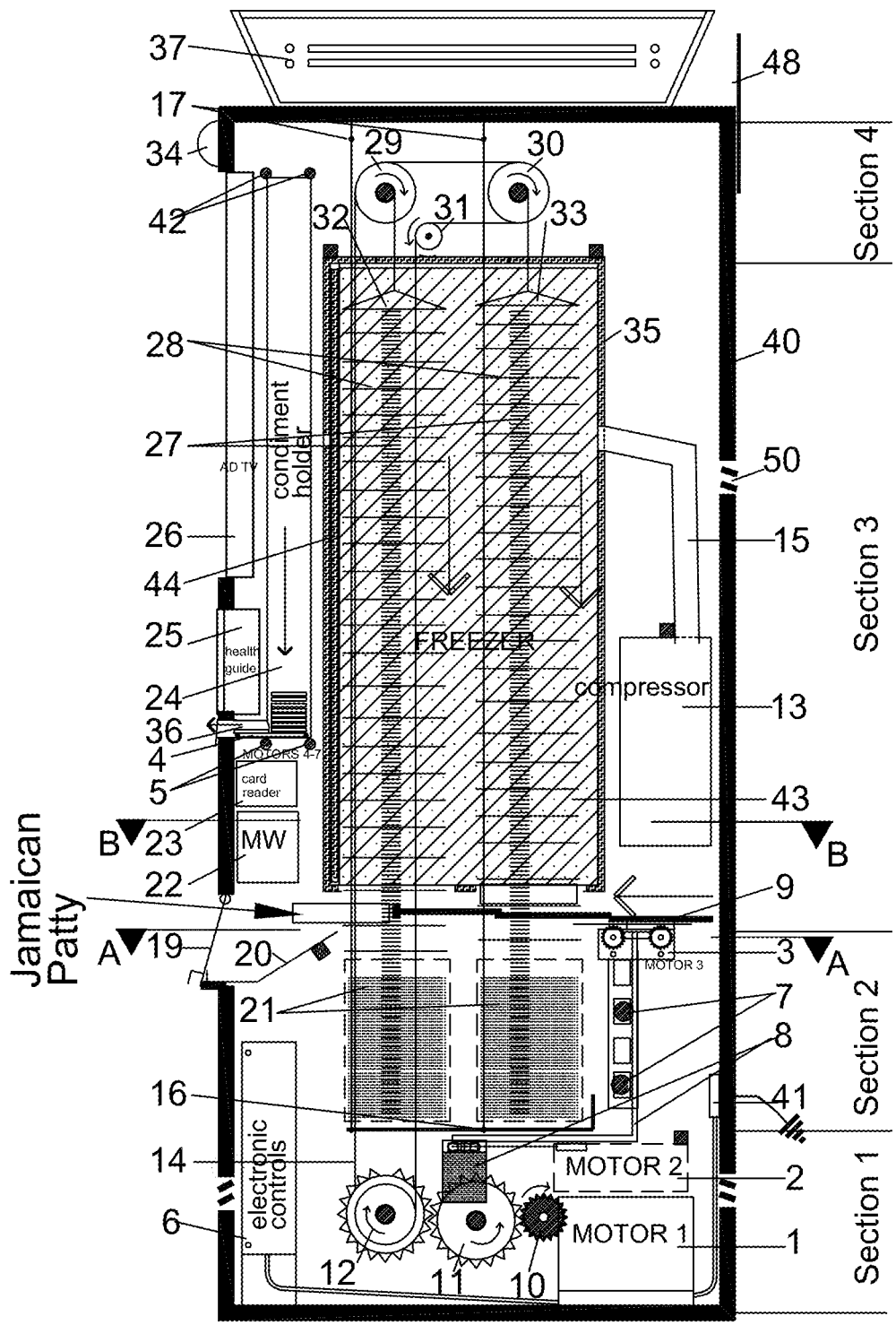
FIG. 2—Longitudinal Section
Figure 3:
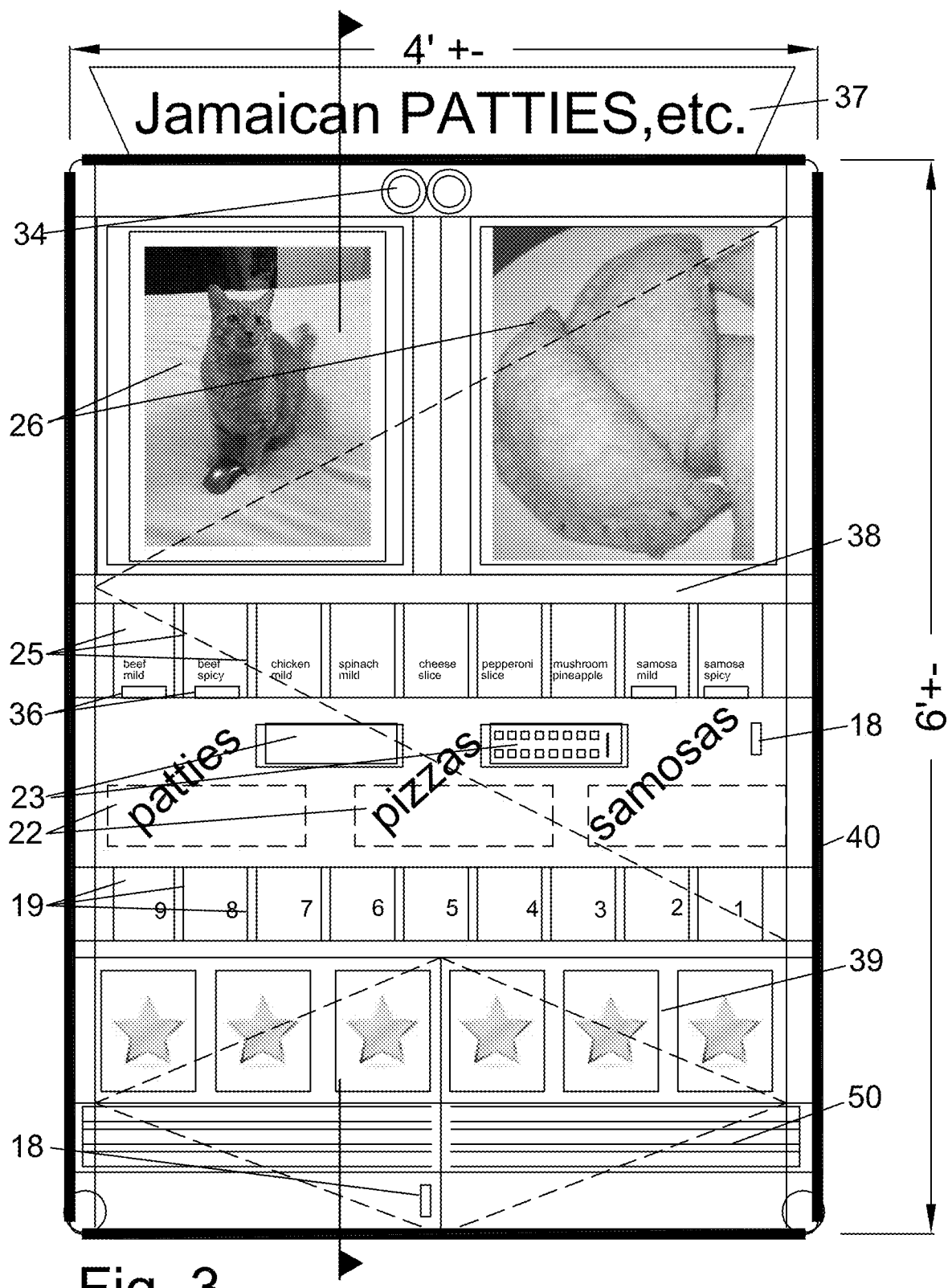
FIG. 3—Front Elevation Wide
Figure 4:
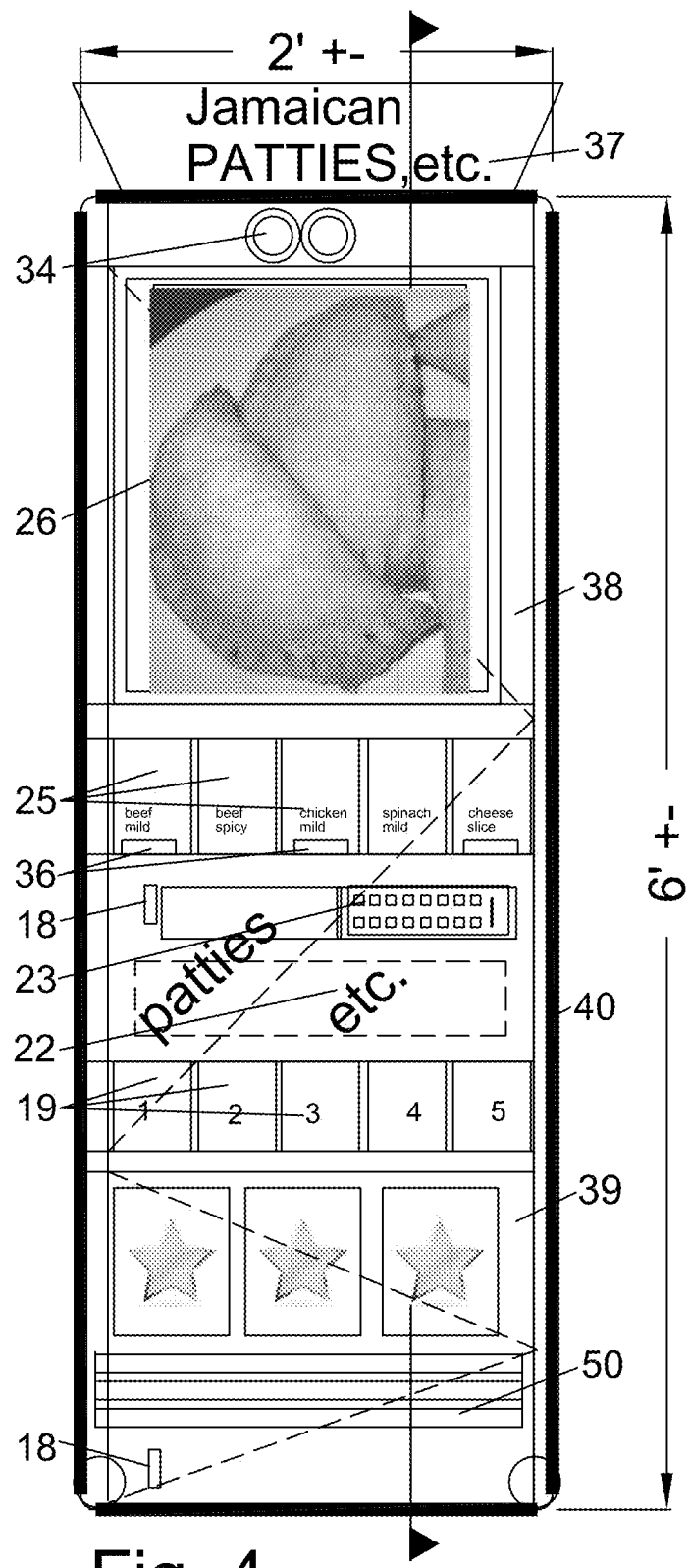
FIG. 4—Front Elevation Narrow

In drawings which illustrate embodiments of the invention, FIGS. 1A and 1B are sectional plans at AA and BB that show location of components, FIG. 2. is a section thru the vending machine to show the vertical relationships of compartments and process flow, FIG. 3 shows the front view of the vending machine with the features and access, FIG. 4 shows an alternative narrow view of the front of the vending machine with the features and access areas.

DETAILED DESCRIPTION OF THE INVENTION

Description

The vending machine that is illustrated comprises an enclosing vented cabinet 40 that is divided horizontally into 4 main sections (See FIG. 2). The lower section houses the main operational machinery and motors, -1, -2 -10, -11, -12; the area above is the empty product tray storage -16, -21; the largest section above that contains the refrigerated or frozen foods -28, -35, for dispensing -9, -19, -20, -24, -36 complete with the product information and customer access -25, food heating -23 and transaction devices in front -23, along with the electronic video screens -26 and optional security camera and audio equipment -34. At the uppermost $4^{th}$ section are the pulley systems -29, -30, -31, that complete the closed loop that allows elevating and lowering -32, -33, of the several vertical product compartments See FIG. 1B, -28 identified as 1-9, and 1a-9a. Servicing and restocking are from the doors in front FIG. 3, -38, -39, and FIG. 4, -38, -39 with the lower doors -39 primarily to be the front machinery servicing portal and separate from the food product area FIG. 2, section 3. The weight of the located operational machinery FIG. 1A, -1, -2, back-up battery -45 and FIG. 2, -1, -2, -10, -11, -12 and contributes to the stability of the enclosure but bracket FIG. 2, -48 connects to a suitable structure to resist overturning. The remote monitoring of the system is provided by the onboard computer system FIG. 1A, -6 and FIG. 2, -6 with internet connectivity that also provides audio and video to the electronic screens FIG. 1B, -26; FIG. 2 -26; FIG. 3, -26 and FIG. 4, -26.

Overview

The operational machinery consists of a motor connected to an energy source FIG. 2, -41 which allows it to be activated by an external signal, including voice activation, at the card reader FIG. 2, FIG. 3, and FIG. 4, -23. The motor FIG. 1A, FIG. 2, -1 turns a horizontal shaft that meshes with a movable gear FIG. 1A, FIG. 2, -10 that is motor driven FIG. 1A, FIG. 2, -2 to slide horizontally by the L arm FIG. 1A, FIG. 1B, FIG. 2, -8 along the horizontal rods FIG. 1A, FIG. 1B, -7 to engage the elevating pulley system FIG. 1A, FIG. 1B, FIG. 2, -12 in a specific vertical product compartment with a frozen food tray FIG. 1A, FIG. 1B, -28. In order for the product to be dispensed from Section 3, FIG. 2, a motor FIG. 1B, FIG. 2, -3 pushes the horizontal retractable arm FIG. 1A, FIG. 1B -8, FIG. 2, -3 forwards and retracts after dispensing in a telescoping fashion. The frozen product, refrigerated by the compressor in Section 3, FIG. 2, -13, is lowered by the elevating pulley system by a metered amount controlled by the electronic controls FIG. 1A, FIG. 2, -6, -25, is heated by the microwave (or induction oven) FIG. 1B, FIG. 2, FIG. 3, FIG. 4, -24 on the shelf FIG. 2, -20 and is removed by the user through the hinged flap FIG. 1B, FIG. 2, FIG. 3, FIG. 4, -19. The hinged flap FIG. 1B, FIG. 2, Fig #, FIG. 4, -19, is interlocked with the microwave FIG. 1B, FIG. 2, FIG. 3, FIG. 4, -22 to stop the microwave when the flap is opened.

Servicing:

As the product is removed by the end-user, the empty elevating shelves are lowered and stacked into each other for storage into the compartment below, FIG. 2, -21. Section 2, where they rest on a shelf -16. The doors are opened FIG. 1A, FIG. 1B, FIG. 3, FIG. 4, -38, -39 by the lock system FIG. 2, -18. and the service buttons FIG. 1A, FIG. 1B, -46, -47 automatically raise the empty product trays from the tray storage FIG. 2, -21, connected by the flexible tray supports -27 back to the freezer area, FIG. 2, -35. They are raised by the motor FIG. 2, -1, that reverses the direction of the pulleys and gears, FIG. 2, -10, -11, -12, -29, -30, -31 connected by the cable FIG. 2, -14 which lifts the hoist platform FIG. 2, -32, -33, the flexible tray support FIG. 2, -27, and the frozen food trays FIG. 2, -28 for servicing and product restocking in the freezer section, -35. The vertical guide rods FIG. 2, -17 maintain alignment of the product trays during travel. The sliding doors FIG. 2, FIG. 1B, -44 are opened to allow access to restock or service the product trays FIG. 2, -28. As the products are in containers, no food material comes in contact with the elevating product trays, -28.

Cooling:

There is a compressor in Section 3, FIG. 2, -13 that refrigerates the products in the thermally insulated freezer FIG. 2, -35. The product tray FIG. 1B, -28 pass thru an opening in the bottom of the insulated freezer FIG. 2, -35 and closes the opening to maintain the designed thermal environment for quality assurance. In the event of a main power failure, a back-up battery is included in the lower section FIG. 2, -45 to ensure food integrity, internet connectivity and computer system.

Display:

Each vertical product compartment for a product tray, FIG. 1A, -21, FIG. 1B, -28 has a display section FIG. 2, FIG. 3, FIG. 4, -25 in the face of the machine, to indicate product availability for the associated product as the stored product is in an opaque insulated enclosure FIG. 1A, FIG. 1B, FIG. 2, -35. The product picture and health guide with calorie value is indicated in the display. When the transaction is started with a credit card, or smartphone or an approved method, at the machine interface, FIG. 2, FIG. 3, FIG. 4, -23, the machine is activated to dispense the product and to activate heating of the corresponding product when payment is complete and a receipt is issued from the machine interface. The display section can be equipped with brail to indicate product selection for the vision impaired.

Condiments:

Any product requiring a condiment or companion product at room temperature is dispensed from a vertical storage container, FIG. 1B, FIG. 2, -24 and where a motor FIG. 2, -4 pushes out a metered supply in a package on a conveyor belt to the dispensing portal, FIG. 2, FIG. 3, FIG. 4, -36.

Video:

The upper front section, has a video screen FIG. 2, FIG. 3, FIG. 4, -26, with optional audio and security camera, FIG. 2, FIG. 3, FIG. 4, -34 to advertise contract programs, offerings, alerts or any programmed information thru internet download, usb file transfer, etc. that is put into the onboard computer system, FIG. 1B, FIG. 2, -6. The audio is connected to the product choice to aid the visually impaired with an announcement of the product selection.

Sign:

In order to aid visibility, there is an optional sign band, FIG. 2, FIG. 3, FIG. 4, -37, at the top of the vending machine. The front and side surfaces of the enclosure FIG. 2, -40 are used for static advertisement.

Electric Power:

This is provided to the machine from a regular 120 volt outlet, FIG. 2, -41, that allows the system to operate electronically. Internet connection is provided also.

SUMMARY OF LISTED ITEMS ON FIG. 1A, FIG. 1B, FIG. 2 FIG. 3, AND FIG. 4

| Item | Name | Description | Shown on FIGURE |
|---|---|---|---|
| 1. | Main Motor 1 | Main bidirectional DC motor for metered rotation | 1A, 2 |
| 2. | Motor 2 | Motorforhorizontaltravel pulley system and attached slidingLarmconnectedtoRetractingarm | 1A, 2 |
| 3. | Motors 3 | Motor that operates Retracting Arm | 1B, 2 |
| 4. | Motors 4, 5, 6,7 | Motors that dispense condimentpackageforeach condimentholder | 2 |
| 5. | Supportcondiment) | Horizontalrodsupportcondimentholder | 2 |
| 6. | Electronic controls | Computer harddrive forsystemcontrol, communication feedback and product counter | 1A, 2 |
| 7. | Support andGuideRod | Guide to support movementofLsliding arm, pulley systerrand retractable arm | 1B, 2 |
| 8. | SlidingL Arm | Assembly that slides horizontally to transfer movement topulleysystem | 1A, 1B, 2 |
| 9. | RetractingArm | AssemblythatmoveswithLslidingarmtoselected product dispenser | 1B, 2 |
| 10. | Drive Shaft | Horizontalgearedshaftdirectlyconnectedtomotor1 | 1A, 2 |
| 11. | Gear &AxleAssembly | Slidinggearthatmovesalongdriveshafttoengage selected gear and pulley when drive shaft and gear are notturning | 1A, 2 |
| 12. | Gear, Pulley & Axle Assembly | Assemblythatactivatesraisingandloweringofproduct tray | 1A, 2 |
| 13. | Compressor (cooling) | Coldairgeneratortofreezeproductincontainer | 1B, 2 |
| 14. | Cable | Continuous vertical cable that provides metered turningofpulleys | 1A, 1B, 2 |
| 15. | Cold air Hose | Cold air supply to product container | 2 |
| 16. | Lower Shelf | Emptytrayholder | 1A, 2 |
| 17. | VerticalGuideRod | Traycolumnalignment control during vertical movement. | 1A, 1B, 2 |
| 18. | Lock | Serviceandmaintenanceaccess | 3,4 |
| 19. | Hinged Customer Panel | Transparent polyurethanehingedpaneinterlocked withmicrowave | 1B, 2, 3,4 |
| 20. | Sloped Shelf | Product tray folcustometaccess. | 1A, 2 |
| 21. | Empty Tray Storage | Lower tray storage | 1A, 2 |
| 22. | Microwave | Appliance to heat product on sloped shelf | 1B, 2, 3, 4 |

-continued

| Item | Name | Description | Shown on FIGURE |
|---|---|---|---|
| 23. | CardReader | Credit card machine/scanner and receipt dispenser | 3, 4 |
| 24. | Condiment Holder | Vertical package holder | 1B, 2 |
| 25. | HealthGuide & Selector | Product picture, description, calorie, and selector with $2^{nd}$ press for microwave action | 2, 3, 4 |
| 26. | Electronic display Screen | Advertisements, product information, community news, etc. | 1B, 2, 3 |
| 27. | Flexible Tray Support | Vertical support that connects trays for lowering and raising | 1A, 1B, 2 |
| 28. | FrozerFoodTray | Product carrier | 1A, 1B, 2 |
| 29. | FrontUpperPulley & Axle | Part of pulley system with circular extension with separate cable that winds to lower or raise tray system. | 1B, 2 |
| 30. | RearUpperPulley & Me | Part of pulley system with circular extension with separate cable that winds to lower or raise tray system. | 1B, 2 |
| 31. | Upper Midway Pulley & Axle | Pulley and axle for continuous loop system for vertical product movement | 1B, 2 |
| 32. | FrontHoistPlatform | Connected to circular extension on upper pulley to move vertical product tray | 2 |
| 33. | ReadHoistPlatform | Connected to circular extension on upper pulley to move vertical product tray | 2 |
| 34. | CamerSystem | Security for vandalism prevention | 2, 3, 4 |
| 35. | InsulateContainer | Holder for the frozen products complete with thermometer | 1A, 1B, 2 |
| W. | CondimenDispenser | Opening that condiment package passes through | 2 |
| 37. | Upper Sign Box | Illuminated sign | 2, 3, 4 |
| 38. | UpperServiceDoor (hinged) | Lockable service access door with attached electronic display screen, condiment dispenser, healthguide, card reader, microwave, hinged panel for product dispensing | 1B, 3, 4 |
| 39. | Lower Service Door (hinged) | Lockable service access door to electronic control system, operating gears drive shafts, pulleys, cables, electric supply. Etc. | 1A, 3, 4 |
| 40. | Cabinet | Main vending machine enclosure with screen vents for air circulation | 1A 1B, 2, 3, 4 |
| 41. | Incoming Power | Connection to external power source | 2 |
| 42. | UpperSupport Rods | For condiment holder | 1B, 2 |
| 43. | FrozeStorage | Refrigerate Products | 1B, 2 |
| 44. | SlidingDoor | Insulated sliding door for product re-stocking ind inspection. | 1B, 2 |
| 45. | Battery Back-up | Back-up power for electronics and compressor to keep products frozen when there is a main power outage. | 1A |
| 46. | UpperServiceButton | Used to move product tray elevator | 1B |
| 47 | LowerServiceButton | Used to move product tray elevator | 1A |
| 48. | Anchor System | Cabinet anchorage to prevent cabinet from falling. | 2 |
| 49. | Conduit | Pathway system for electronics power, voice and video | 1A, 1B |
| 50. | Vent | Cabinet venting | 2, 3, 4 |
| 51. | | | |
| 52. | | | |
| 53. | | | |

The invention claimed is:

1. A vending machine for food products comprising a thermally insulated freezer, a microwave oven and a display, wherein the thermally insulated freezer comprises a plurality of shelves supporting a plurality of food products; said plurality of shelves arranged in a vertical column; said plurality of shelves attached to each other by flexible supports; said plurality of shelves being suspended from a cable connected to a pulley and gear adapted to vertically move the vertical column of shelves so as to position a selected food product for dispensing upon purchase of the selected food product.

2. The vending machine from claim 1 wherein said vending machine further comprises a vertical condiment storage column adapted to dispense a condiment to an externally-accessible aperture.

3. The vending machine according to any previous claims wherein said vending machine has the display connected to the internet and the onboard computer system where the upload and download of information is displayed on the display.

4. The vending machine according to any previous claims wherein said vending machine has a counter that transmits product status of quantity in a vertical column.

5. The vending machine according to any previous claims wherein said vending machine further comprises a sign box that indicates the vending machine is in use, along with camera and speaker function.

6. The vending machine according to any previous claims wherein said vending machine further comprises a horizontal product tray for customer access and a hinged customer panel interlocked with the microwave oven to stop microwave action when said customer panel is raised.

7. The vending machine according to any previous claims wherein a credit card or smartphone purchase activates a purchasing and dispensing process.

* * * * *